United States Patent
Yasuda et al.

(10) Patent No.: US 10,118,459 B2
(45) Date of Patent: Nov. 6, 2018

(54) BATTERY COOLING STRUCTURE FOR VEHICLE

(71) Applicant: HONDA MOTOR CO., LTD., Tokyo (JP)

(72) Inventors: Tomofumi Yasuda, Wako (JP); Atsushi Mizutani, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 8 days.

(21) Appl. No.: 15/545,759

(22) PCT Filed: Dec. 10, 2015

(86) PCT No.: PCT/JP2015/084680
§ 371 (c)(1),
(2) Date: Jul. 24, 2017

(87) PCT Pub. No.: WO2016/125388
PCT Pub. Date: Aug. 11, 2016

(65) Prior Publication Data
US 2018/0015806 A1 Jan. 18, 2018

(30) Foreign Application Priority Data

Feb. 5, 2015 (JP) ................................. 2015-020836

(51) Int. Cl.
*B60H 1/00* (2006.01)
*B60K 1/04* (2006.01)
(Continued)

(52) U.S. Cl.
CPC ..... *B60H 1/00278* (2013.01); *B60H 1/00385* (2013.01); *B60K 1/04* (2013.01);
(Continued)

(58) Field of Classification Search
CPC ...... B60K 2001/005; B60K 2001/0416; B60K 2001/0438; B60H 1/00278
See application file for complete search history.

(56) References Cited

U.S. PATENT DOCUMENTS 8,741,465 B2 * 6/2014 Nagata ..................... B60K 1/04
429/120
9,000,724 B2 * 4/2015 Minami ............. B60H 1/00278
320/109

(Continued)

FOREIGN PATENT DOCUMENTS

JP 2008-62781 A 3/2008
JP 2008-141945 A 6/2008
(Continued)

OTHER PUBLICATIONS

International Search Report dated Feb. 16, 2016, issued in counterpart application No. PCT/JP2015/084680, w/ English translation. (3 pages).

(Continued)

*Primary Examiner* — Brian L Swenson
(74) *Attorney, Agent, or Firm* — Westerman, Hattori, Daniels & Adrian, LLP

(57) ABSTRACT

A battery cooling structure for a vehicle includes: a battery storage space that is defined underneath a luggage compartment provided behind a rear seat and covered by a rear floor; a battery module that is stored in the battery storage space; a battery cooling unit that cools the battery module using air taken in from a passenger compartment, and discharges air into the battery storage space; a partition member that separates the battery storage space and a rear seat underside space that is provided underneath the rear seat; a passenger compartment-bound exhaust air flow path that returns an exhaust air discharged into the battery storage space to the passenger compartment by way of the rear seat underside (Continued)

space and an exhaust air passage hole formed in the partition member; and a luggage compartment-bound exhaust air flow path that discharges the exhaust air into the luggage compartment.

11 Claims, 9 Drawing Sheets

(51) Int. Cl.
 *B60L 11/18* (2006.01)
 *H01M 10/613* (2014.01)
 *H01M 10/6561* (2014.01)
 *H01M 10/625* (2014.01)
 *B60K 1/00* (2006.01)

(52) U.S. Cl.
 CPC ....... *B60L 11/1874* (2013.01); *H01M 10/613* (2015.04); *H01M 10/625* (2015.04); *H01M 10/6561* (2015.04); *B60H 2001/003* (2013.01); *B60K 2001/005* (2013.01); *B60K 2001/0416* (2013.01); *B60K 2001/0438* (2013.01); *H01M 2220/20* (2013.01)

(56) References Cited

U.S. PATENT DOCUMENTS

| | | |
|---|---|---|
| 2008/0062622 A1 | 3/2008 | Fukazu et al. |
| 2008/0196957 A1* | 8/2008 | Koike ............... B60K 1/04 180/68.5 |
| 2008/0296075 A1* | 12/2008 | Zhu ................... B60K 1/04 180/68.1 |
| 2010/0099019 A1 | 4/2010 | Nagata et al. |
| 2013/0049688 A1 | 2/2013 | Minami |
| 2013/0087303 A1* | 4/2013 | Lim ................... B60K 1/04 165/41 |
| 2015/0060167 A1* | 3/2015 | Janarthanam ...... B60H 1/00278 180/68.1 |
| 2015/0367718 A1* | 12/2015 | Hayashi ............. B60R 16/04 180/68.5 |
| 2016/0023547 A1* | 1/2016 | Tsuchiya ............ B60K 1/04 180/68.1 |

FOREIGN PATENT DOCUMENTS

| | | |
|---|---|---|
| JP | 2009-12606 A | 1/2009 |
| WO | 2011/145380 A1 | 11/2011 |

OTHER PUBLICATIONS

Written Opinion dated Feb. 16, 2016, issued in counterpart application No. PCT/JP2015/084680 (3 pages).

* cited by examiner

BATTERY COOLING STRUCTURE FOR VEHICLE

TECHNICAL FIELD

The present invention relates to a battery cooling structure for a vehicle such as an electric vehicle or a hybrid electric vehicle.

BACKGROUND ART

Battery modules are installed on an electric vehicle or a hybrid electric vehicle that uses a motor as a drive source. For example, Patent Literature 1 discloses a vehicle in which battery modules are installed in a space defined underneath a luggage compartment.

Vehicles of this type include a battery cooling unit for holding the temperature of a battery within a proper temperature range to prevent the deterioration in performance of the battery which would be caused by an abnormal increase in temperature of the battery. For example, in the vehicle described in Patent Literature 1 above, the battery is cooled by air that is taken in from the passenger compartment, and the air, which has been used to cool the battery, is then separately let out to the outside of the vehicle and into the space defined underneath the luggage compartment. The exhaust air that is discharged into the space underneath the luggage compartment is designed to be returned to the passenger compartment through exhaust air passage holes that are formed in a partition panel that separates the passenger compartment from the luggage compartment.

PRIOR ART LITERATURE

Patent Literature

Patent Literature 1: JP-A-2009-12606

SUMMARY OF THE INVENTION

Problem that the Invention is to Solve

With the vehicle described in Patent Literature 1, however, since the exhaust air that is to be returned to the passenger compartment is all returned to the passenger compartment, there are fears that the occupant or occupants are caused to feel uncomfortable.

The invention is to provide a battery cooling structure for a vehicle that can ensure a comfortable in-vehicle environment by restraining an occupant or occupants of a vehicle from being caused to feel uncomfortable by air that is returned into a passenger compartment after cooling a battery.

Means for Solving the Problem

The invention provides the following aspects. According to a first aspect of the invention, there is provided a battery cooling structure for a vehicle (e.g., a vehicle 1 described in embodiment) including:

a battery storage space (e.g., a battery storage space 5 in embodiment) that is defined underneath a luggage compartment (e.g., a luggage compartment 3 in embodiment) provided behind a rear seat (e.g., a rear seat 2 in embodiment) and covered by a rear floor (e.g., a rear floor 3a in embodiment);

a battery module (e.g., battery modules 11 in embodiment) that is stored in the battery storage space; and a battery cooling unit (e.g., a cooling mechanism 18 in embodiment) that cools the battery module using air taken in from a passenger compartment, and discharges air used to cool the battery module into the battery storage space, wherein the battery cooling structure further includes:

a partition member (e.g., a partition member 134 in embodiment) that separates the battery storage space and a rear seat underside space that is provided underneath the rear seat;

a passenger compartment-bound exhaust air flow path (e.g., a passenger compartment-bound exhaust air flow path 131 in embodiment) that returns an exhaust air discharged into the battery storage space to the passenger compartment by way of the rear seat underside space and an exhaust air passage hole (e.g., a first exhaust air passage hole 134a and a second exhaust air passage hole 134b in embodiment) formed in the partition member; and a luggage compartment-bound exhaust air flow path (e.g., a luggage compartment-bound exhaust air flow path 132 in embodiment) that discharges the exhaust air into the luggage compartment.

According to a second aspect, in the battery cooling structure for a vehicle according to the first aspect, the battery cooling structure further includes an outlet port (e.g., an outlet port 136 in embodiment) that is provided below a front end portion of the rear seat, wherein the outlet port communicates with the exhaust air passage hole by way of the rear seat underside space.

According to a third aspect, in the battery cooling structure for a vehicle according to the first aspect, the battery cooling structure further includes an outlet port (e.g., the outlet port 136 in embodiment) that is provided below a front end portion of the rear seat, wherein the outlet port communicates with the exhaust air passage hole by way of an outlet duct that is provided in the rear seat underside space.

According to a fourth aspect, in the battery cooling structure for a vehicle according to the second or third aspect, the battery cooling structure further includes an inlet port (e.g., an inlet port 137 in embodiment) that introduces air to cool the battery module from the passenger compartment, wherein the inlet port is disposed at one transverse end portion (e.g., a right transverse end portion in embodiment) below the front end portion of the rear seat, and wherein the outlet port is disposed at an other transverse end portion (e.g., a left transverse end portion in embodiment) below the front end portion of the rear seat.

According to a fifth aspect, in the battery cooling structure for a vehicle according to the fourth aspect, the outlet port and the inlet port open obliquely forwards and outwards to thereby be directed to corresponding adjacent doors.

According to a sixth aspect of the invention, there is provided a battery cooling structure for a vehicle (e.g., the vehicle 1 described in embodiment) including:

a battery storage space (e.g., the battery storage space 5 in embodiment) that is defined underneath a luggage compartment (e.g., the luggage compartment 3 in embodiment) provided behind a rear seat (e.g., the rear seat 2 in embodiment) and covered by a rear floor (e.g., the rear floor 3a in embodiment);

a battery module (e.g., the battery modules 11 in embodiment) that is stored in the battery storage space; and a battery cooling unit (e.g., the cooling mechanism 18 in embodiment) that cools the battery module using air that is taken in from a passenger compartment (e.g., the passenger compartment 6 in embodiment) and discharges air used to cool the battery module into the battery storage space, wherein the battery cooling structure further includes:

a passenger compartment-bound exhaust air flow path (e.g., the passenger compartment-bound exhaust air flow path 131 in embodiment) that returns an exhaust air discharged into the battery storage space to the passenger compartment; and a luggage compartment-bound exhaust air flow path (e.g., the luggage compartment-bound exhaust air flow path 132 in embodiment) that discharges the exhaust air into the luggage compartment, wherein an inlet port (e.g., the inlet port 137 in embodiment) that introduces air to cool the battery module from the passenger compartment is disposed at one transverse end portion (e.g., the right transverse end portion in embodiment) below a front end portion of the rear seat, and wherein an outlet port (e.g., the outlet port 136 in embodiment) of the passenger compartment-bound exhaust air flow path is disposed at an other transverse end portion (e.g., the left transverse end portion in embodiment) below the front end portion of the rear seat.

According to a seventh aspect, in the battery cooling structure for a vehicle according to the sixth aspect, the inlet port and the outlet port are disposed transversely symmetrical with each other with respect to a transverse center line (e.g., a transverse center line L in embodiment) of the vehicle.

According to an eighth aspect, in the battery cooling structure for a vehicle according to the sixth or seventh aspect, the outlet port and the inlet port open obliquely forwards and outwards to thereby be directed to corresponding adjacent doors.

Advantages of the Invention

According to the first aspect, since the exhaust air used to cool the battery module is let out separately to the passenger compartment and the luggage compartment by way of the battery storage space, the exhaust air (exhaust heat) is restrained from influencing an occupant or occupants, thereby making it possible to ensure a comfortable in-vehicle environment. Additionally, this configuration can be applied not only to a so-called sedan-type passenger vehicle in which a partition panel is erected to separate a passenger compartment and a luggage compartment but also to a so-called minivan-type vehicle, a compact vehicle or an SUV (Sport Utility Vehicle) in which a partition panel is not provided to separate a passenger compartment and a luggage compartment.

According to the second aspect, since the exhaust air used to cool the battery module is returned to the passenger compartment from the outlet port that is provided below the front end portion of the rear seat, the temperature of a rear seat overhead space is restrained from being increased by the exhaust air that is returned to the passenger compartment, thereby making it possible to improve further the in-vehicle environment.

According to the third aspect, since the outlet port communicates with the exhaust air passage hole by way of the outlet duct that is provided in the rear seat underside space, not only can an unexpected leakage of the exhaust air used to cool the battery module be prevented, but also the flow of the exhaust air can be controlled in an ensured fashion to thereby suppress an increase in temperature at a rear seat cushion portion.

According to the fourth aspect, since the inlet port and the outlet port are spaced apart from each other, the influence of the exhaust air that is returned from the outlet port into the passenger compartment on the intake air that is to be taken in to cool the battery module is reduced, thereby making it possible to suppress a reduction in cooling efficiency.

According to the fifth aspect, since the outlet port and the inlet port open in the opposite directions, the influence of the exhaust air that is returned from the outlet port into the passenger compartment on the intake air that is to be taken in to cool the battery module can be reduced further.

According to the sixth aspect, since the exhaust air used to cool the battery module is let out separately to the passenger compartment and the luggage compartment by way of the battery storage space, the exhaust air (exhaust heat) is restrained from influencing an occupant or occupants, thereby making it possible to ensure a comfortable in-vehicle environment. Additionally, since the exhaust air used to cool the battery module is returned to the passenger compartment from the outlet port that is provided below the front end portion of the rear seat, the temperature of a rear seat overhead space is restrained from being increased by the exhaust air that is returned to the passenger compartment, thereby making it possible to ensure a comfortable in-vehicle environment. Further, since the inlet port and the outlet port are spaced apart from each other, the influence of the exhaust air that is returned from the outlet port into the passenger compartment on the intake air that is to be taken in to cool the battery module is reduced, thereby making it possible to suppress a reduction in cooling efficiency.

According to the seventh aspect, since the inlet port and the outlet port are disposed symmetrical with each other with respect to the transverse center line, the appearance can be improved.

According to the eighth aspect, since the outlet port and the inlet port open in the opposite directions, the influence of the exhaust air that is returned from the outlet port into the passenger compartment on the intake air that is to be taken in to cool the battery module can be reduced further.

MODE FOR CARRYING OUT THE INVENTION

Figure 1:
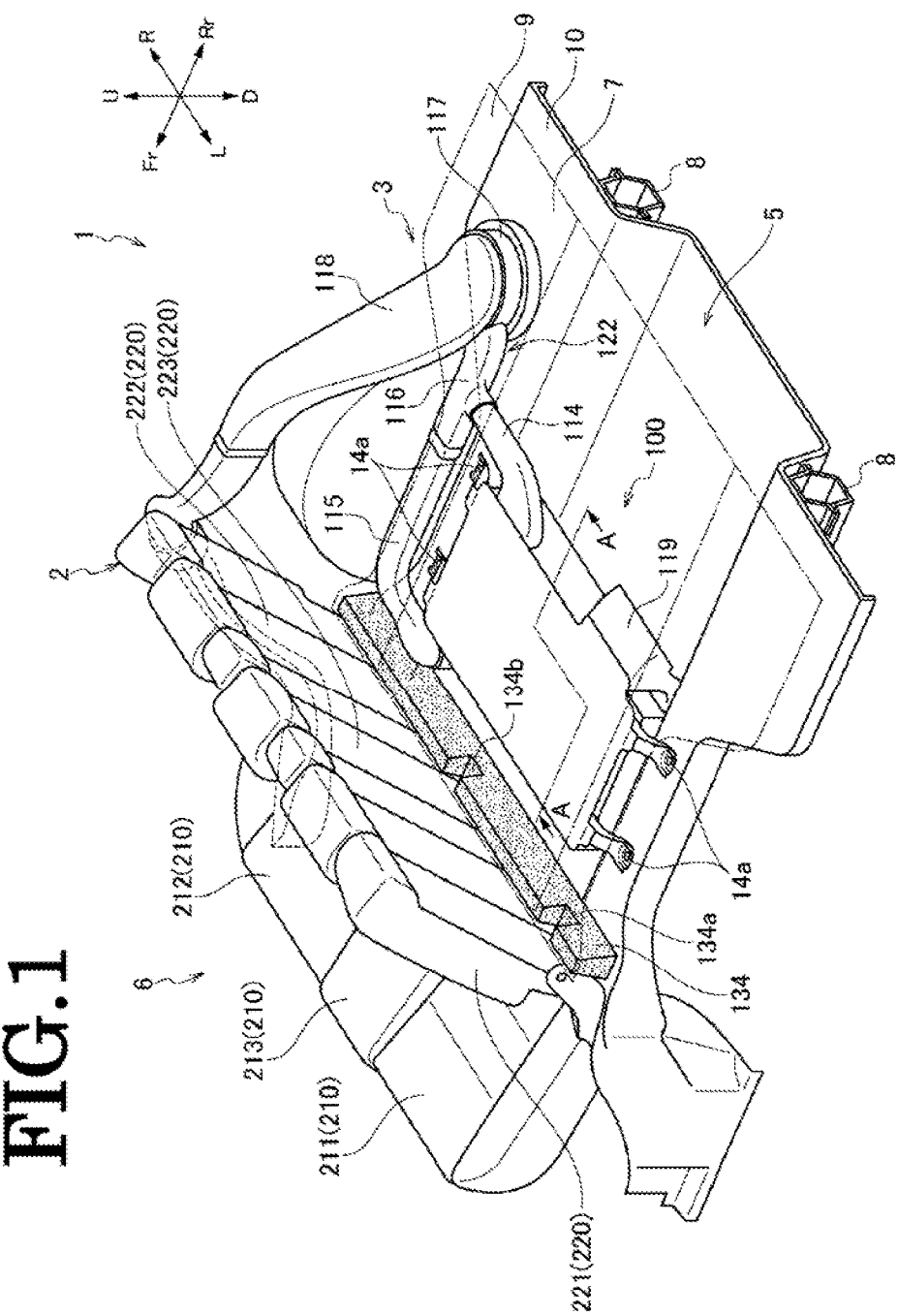
FIG. 1 is a perspective view showing a rear part of a passenger compartment and a luggage compartment of a vehicle that adopts a battery cooling structure according to an embodiment of the invention.

Hereinafter, an embodiment of a battery cooling structure for a vehicle according to the invention will be described based on the accompanying drawings. The drawings should be seen in a direction in which given reference numerals look normal. In the following description, front, rear, left, right, up and down denote accordingly directions as seen from a driver of the vehicle. The front, rear, left, right, up and down sides of the vehicle are denoted by Fr, Rr, L, R, U and D, respectively.

[Vehicle]

FIG. 1 is a perspective view showing a rear part of a passenger compartment 6 and a luggage compartment 3 of a vehicle 1 that adopts a battery cooling structure according to an embodiment of the invention.

As shown in FIG. 1, the vehicle 1 has the luggage compartment 3 at the rear of a rear seat 2. A battery storage space 5 is provided underneath the luggage compartment 3 by bending a floor panel 7 so as to form a recessed portion thereon, and a battery unit 100 is disposed in this battery storage space 5. A pair of floor frames 8 extend in a front-rear direction of the vehicle 1 beneath the floor panel 7 and at both sides of the battery storage space 5. The luggage compartment 3 is separated from a luggage compartment underside space 10 including the battery storage space 5 by a rear floor 3a (refer to FIG. 9) and extending portions 4a of side trims 4 (refer to FIG. 9) that cover the battery unit 100. Reference numeral 9 in FIG. 1 denotes a floor surface of the luggage compartment 3.

[Battery Unit]

Figure 2:
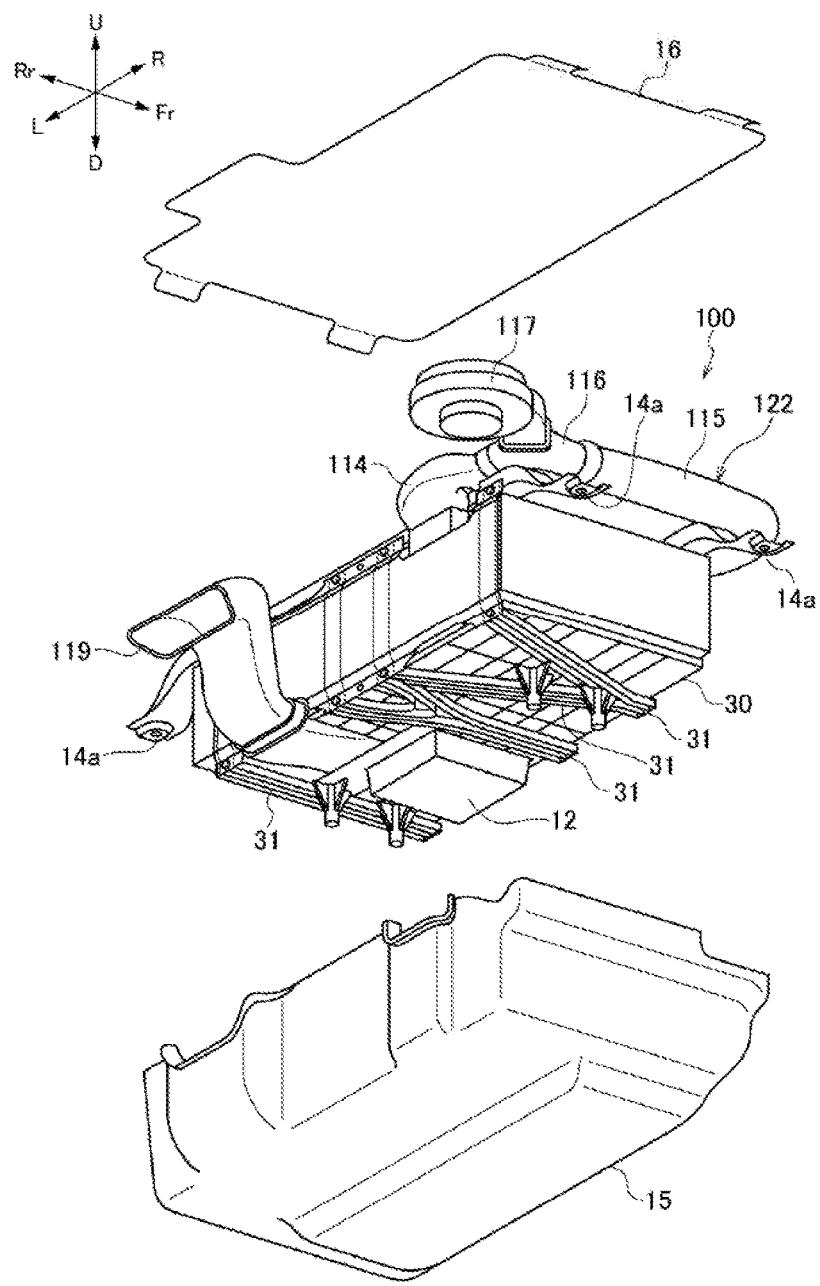
FIG. 2 is an exploded perspective view of a battery unit.
Figure 3:
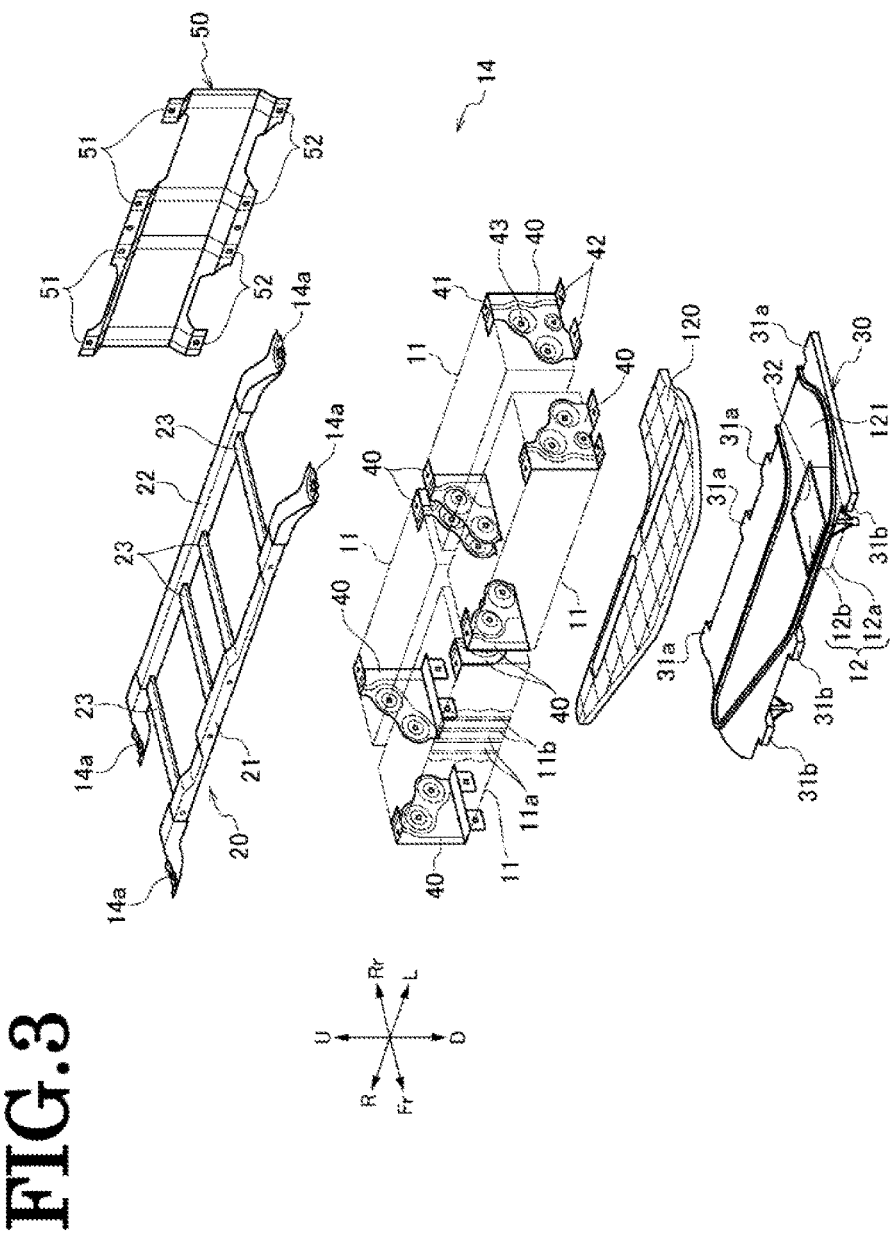
FIG. 3 is an exploded perspective view of a battery frame.
Figure 4:
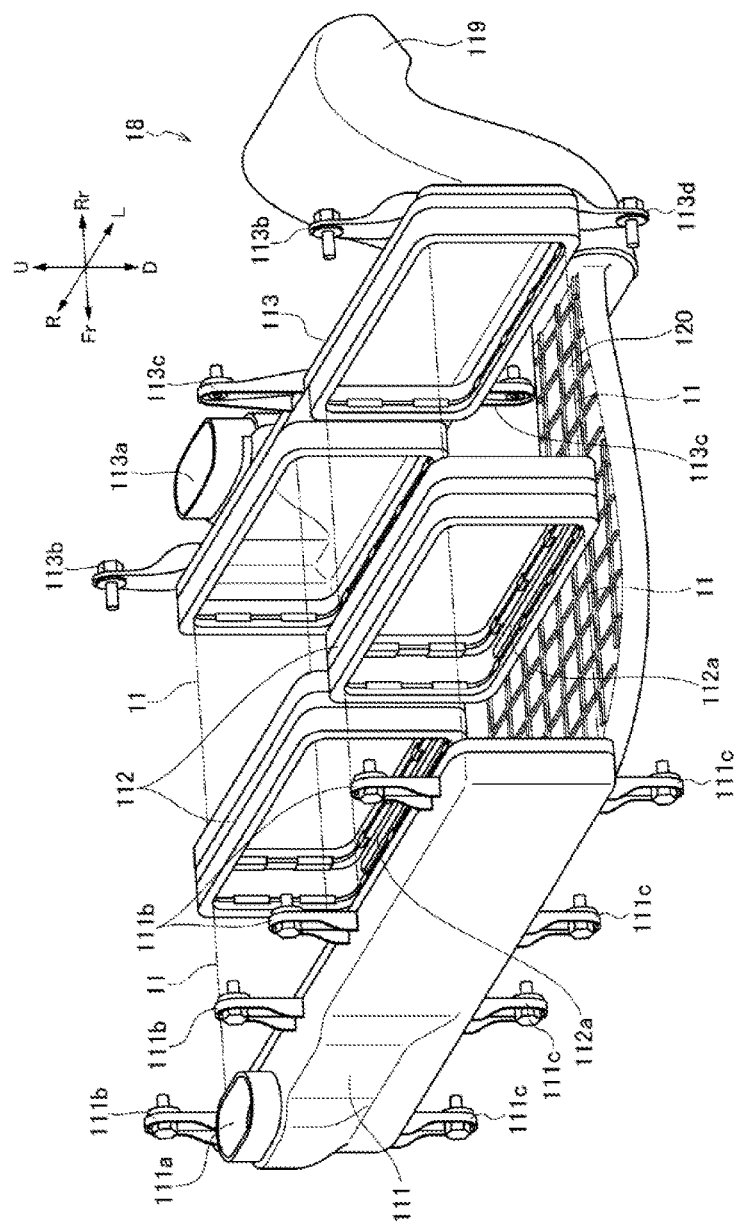
FIG. 4 is a perspective view showing battery modules and ducts.

FIG. 2 is an exploded perspective view of the battery unit 100, FIG. 3 is an exploded perspective view of a battery frame 14, and FIG. 4 is a perspective view showing battery modules 11 and ducts.

As shown in FIGS. 2 to 4, the battery unit 100 of this embodiment includes the battery modules 11 each having a plurality of batteries 11a, a DC-DC converter 12, a battery frame 14 for holding the battery modules 11 and the DC-DC converter 12, a case 15 for storing the aforesaid constituent components, a cover 16 that covers an upper opening of the case 15, and a cooling mechanism 18 as a battery cooling unit for cooling the battery modules 11 and the DC-DC converter 12. As shown in FIG. 1, fixing portions 14a of the battery frame 14 which project transversely to the left and right from the case 15 are fixed to the floor frames 8 via the floor panel 7, whereby not only are the battery modules 11 are disposed in the battery storage space 5, but also the battery unit 100 is disposed in a luggage compartment underside space 10. An upstream-side inlet duct 118 of the cooling mechanism 18, which will be described later, passes inside the right side trim 4 to extend to a portion below the rear seat 2.

[Battery Module]

As shown in FIG. 2, the battery modules 11 have individually a rectangular parallelepiped shape and are disposed in the battery unit 100 in such a way that longer or longitudinal sides of the battery modules 11 follow a left-right direction (or a transverse direction) of the vehicle 1. A plurality of batteries 11a, which are disposed vertically, are aligned in the transverse direction in each of the battery modules 11. The vertical arrangement of the batteries 11a means that a shortest side in three sides of the battery 11a extends in the transverse direction. In addition, cooling air flow paths 11b, which will be described later, are formed individually between the adjacent batteries 11a so as to extend along a front-rear direction of the vehicle 1, and these cooling air flow paths 11b constitute flow paths through which cooling air passes. The cooling air flow paths 11b are opened at front and rear sides and are closed airtight at upper and lower sides thereof.

The number of battery modules 11 that the battery unit 100 of this embodiment has is four, and these four battery modules 11 are disposed inside the battery unit 100 in such a way that two battery modules 11 are aligned side by side in the left and right direction and two battery modules 11 are aligned side by side in the front-rear direction (the lengthwise direction) of the vehicle 1. As shown in FIG. 4, in the left and right battery modules 11 disposed on the front side, front end portions thereof are fitted in a front duct 111, whereas rear end portions thereof are fitted individually in middle ducts 112. Additionally, in the left and right battery modules 11 disposed on the rear side, rear end portions thereof are fitted in a rear duct 113, whereas front end portions thereof are fitted individually in the middle ducts 112. The front duct 111, the middle duct 112 and the rear duct 113 make up the cooling mechanism 18 together with a downstream-side inlet duct 122 (including a first introducing duct portion 114, a second introducing duct portion 115 and a branch portion 116), which will be described later, a cooling fan 117, the upstream-side inlet duct 118, an outlet duct 119 and a cooling portion forming member 120.

Cooling air introducing ports 111a, 113a are formed at right end upper portions of the front duct 111 and the rear duct 113, respectively, and the cooling air introducing ports 111a, 113a are made to communicate with the cooling fan 117 by way of the downstream-side inlet duct 122. The cooling fan 117 takes in air from the passenger compartment 6 of the vehicle 1 by way of the upstream-side inlet duct 118 and sends the air so taken in towards the downstream-side inlet duct 122, where the air is divided into an air flow that flows into an interior of the front duct 111 and an air flow that flows into an interior of the rear duct 113. Air that is sent into the interiors of the front duct 111 and the rear duct 113 flows into the cooling air flow paths 11b of the battery modules 11 to cool the batteries 11a and then reaches an interiors of the middle ducts 112. The air that has reached the interior of the middle duct 112 is let out to an auxiliary component cooling portion 121 (refer to FIG. 3) that is situated below the battery modules 11 via outlet holes 112a that are formed in lower portions of the middle ducts 112 and cools the DC-DC converter 12 at the auxiliary component cooling portion 121. The air that has cooled the DC-DC converter 12 is let out from the outlet duct 119 that is provided at a rear portion of the battery module 100 into the battery storage space 5. Then, the air that is let out into the battery storage space 5 is returned to the passenger compartment 6 by way of a passenger compartment-bound exhaust air flow path 131, which will be described later and is discharged into the luggage compartment 3 by way of a luggage compartment-bound exhaust air flow path 132, which will be described later. The passenger compartment-bound exhaust air flow path 131 and the luggage compartment-bound exhaust air flow path 132, both of which constitute a gist of the invention, will be described in detail after the description of the battery frame 14.

[Battery Frame]

As shown in FIG. 3, the battery frame 14 includes a frame assembly 20 that is disposed on the battery modules 11, a lower rigid member 30 that is disposed below the battery modules 11, a plurality of connecting members 40 that connects the lower rigid member 30 and the frame assembly 20 together and a rear protection member 50 that is disposed at the rear of the battery modules 11. The cooling portion forming member 120 is provided on an upper surface of the lower rigid body 30 and forms the auxiliary component cooling portion 121 in an interior space that is defined by the lower rigid member 30 and itself.

The frame assembly 20 is a ladder-shaped frame, when seen from thereabove, that has a front frame member 21 and a rear frame member 22 that extend in the transverse direction of the vehicle 1 that constitutes the longitudinal direction of the battery modules 11 and four connecting rigid members 23 that connect the front frame member 21 and the rear frame member 22 together.

The front frame member 21 and the rear frame member 22 have the shape of a hollow angular pipe, and the fixing portions 14a are provided integrally at left and right end portions of the front and rear frame members 21, 22, whereby the front and rear frame members 21, 22 are fixed to the floor frames 8 of the vehicle 1 via the fixing portions 14a as described above. The front duct 111 is bolted to the front frame member 21 via four upper attaching arm portions 111b (refer to FIG. 4) that are provided at an upper portion of the front duct 111 so as to extend individually upwards therefrom, and the rear duct 113 is bolted to the rear frame member 22 via two left and right upper attaching arm portions 113b (refer to FIG. 4) that are provided at an upper portion of the rear duct 113 so as to extend individually upwards therefrom. A clip is provided on a central arm portion 113c that is provided at a center of the rear duct 113 so as to extend vertically for use in fastening temporarily the rear protection member 50. The plurality of connecting rigid members 23 have individually an inverted U-shaped cross-sectional shape that opens downwards and are connected to upper end portions of the connecting members 40, whereby the connecting rigid members 23 hold the battery modules 11 in a suspended state via the connecting members 40.

The frame assembly 20 and the lower rigid member 30 are made to function as a load passing member that transmits impact to the front when the vehicle 1 is involved in a rear collision.

The lower rigid member 30 is a plate-shaped rigid member which makes up a bottom portion of the battery unit 100 and is connected to lower end portions of the connecting members 40 to thereby be held by the frame assembly 20 in a suspended state via the connecting members 40.

As shown in FIG. 2, a plurality of rib groups 31, which extend along the front-rear direction, are formed parallel on a lower surface portion of the lower rigid member 30 to transmit impact resulting when the vehicle 1 is involved in a rear collision to the front in an ensured fashion. A rear end portion 31a of each of the rib groups 31 projects further rearwards than the other portions of the lower rigid member 30, and a front end portion 31b of each of the rib groups 31 projects further forwards than the other portions of the lower rigid member 30, as shown in FIG. 3. The front duct 111 is bolted to the vicinity of the front end portions 31b of the rib groups 31 via four lower attaching arm portions 111c that are provided at a lower portion of the front duct 111 so as to extend downwards therefrom.

In addition, the DC-DC converter 12 is disposed on the lower surface portion of the lower rigid member 30. In this embodiment, the DC-DC converter 12 is disposed on a left front lower surface area when a lower surface area of the lower rigid member 30 is divided equally into four areas in the longitudinal and transverse directions. The DC-DC converter 12 includes a converter main body 12a and a plurality of cooling fins 12b that are erected on an upper surface of the DC-DC converter main body 12a. The DC-DC converter 12 is attached to the lower rigid member 30 so as to extend through a converter attaching hole 32 formed in the lower rigid member 30 in such a way that the converter main body 12a is positioned on a lower surface side of the lower rigid member 30 and the cooling fins 12b are positioned on an upper surface side of the lower rigid member 30 to thereby be exposed to the auxiliary component cooling portion 121.

In this embodiment, an upper fixing portion 41 configured to be fixed to the frame assembly 20 is provided at an upper end portion of each of the connecting members 40, while lower fixing portions 42 configured to be fixed to the lower rigid member 30 are provided at a lower end portion thereof. Additionally, a battery attaching portion 43 is formed at a vertically middle portion of each of the connecting members 40, and left and right end portions of each of the battery modules 11 are attached to the battery attaching portions 43, whereby the battery modules 11 are held to the frame assembly 20 via the connecting members 40 in a suspended state.

The rear protection member 50 is a member that is designed not only to protect the rear portion of the battery unit 100 when the vehicle 1 is involved in a rear collision but also to transmit impact resulting from the rear collision to the frame assembly 20 and the lower rigid member 30. In this embodiment, four upper fixing portions 51 configured to be fixed to the rear frame member 22 of the frame assembly 20 are provided at an upper end portion of the rear protection member 50, while four lower fixing portions 52 configured to be fixed to the lower rigid member 30 are provided at a lower end portion thereof. The four upper fixing portions 51 are fixed to a rear surface of the rear frame member 22 in positions lying behind the corresponding connecting rigid members 23 together with the two left and right upper attaching arm portions 113b (refer to FIG. 4) that are provided at the upper portion of the rear duct 113 so as to extend upwards therefrom. In addition, the four lower fixing portions 52 are fixed to the rear end portions 31a of the individual rib groups 31 of the lower rigid member 30 together with two left and right lower attaching arm portions 113d (refer to FIG. 4) that are provided at a lower portion of the rear duct 113 so as to extend downwards therefrom.

The battery unit 100 that is configured as has been described heretofore is built up in advance and is then attached to the vehicle 1 as a unit in the way described above.

[Passenger Compartment-Bound Exhaust Air Flow Path and Luggage Compartment-Bound Exhaust Air Flow Path]

Figure 5:
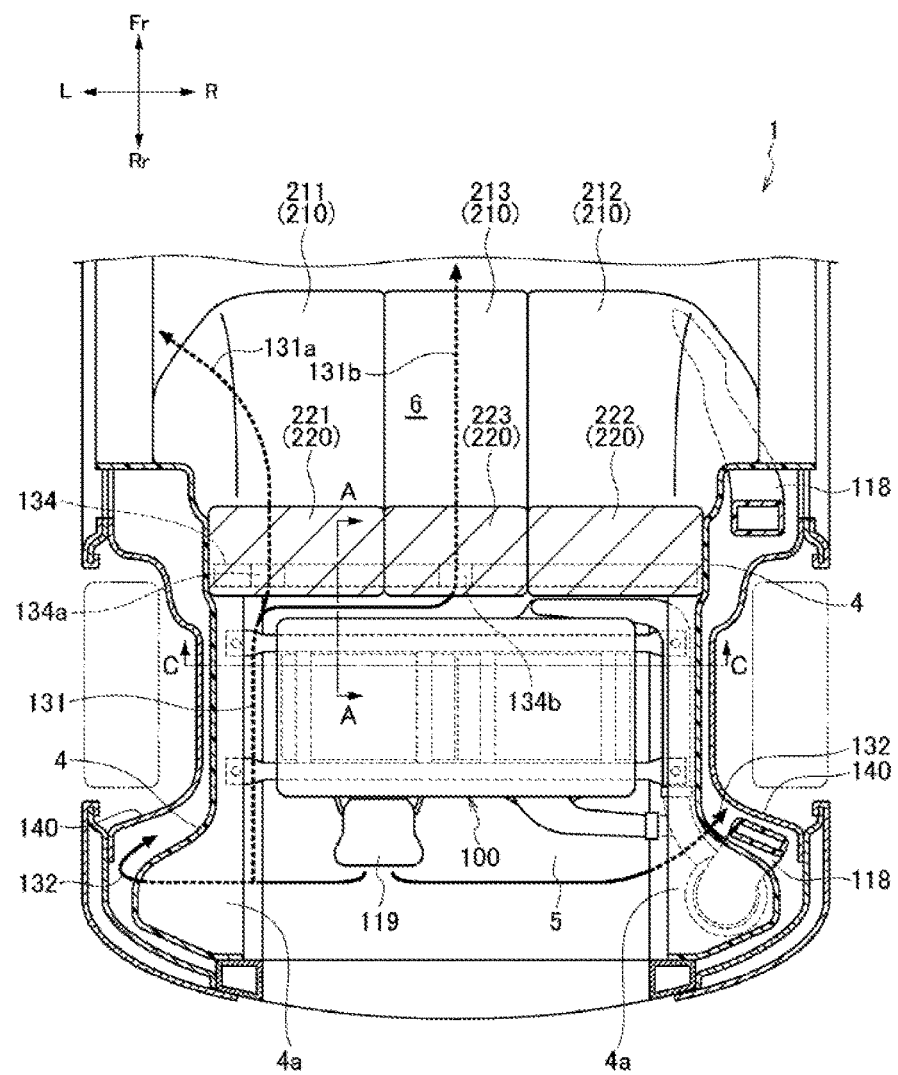
FIG. 5 is a plan view of the rear part of the passenger compartment and the luggage compartment, showing a passenger compartment-bound exhaust air flow path and a luggage compartment-bound exhaust air flow path.
Figure 7:
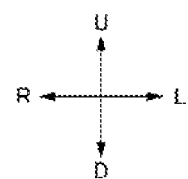
FIG. 7 is a front view of a lower portion of a rear seat, showing positions of an inlet port and an outlet port.
Figure 7:
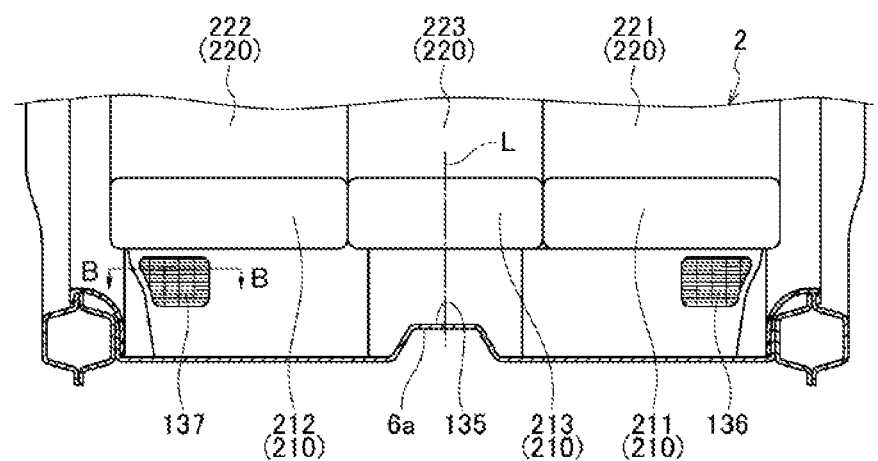
Figure 8:
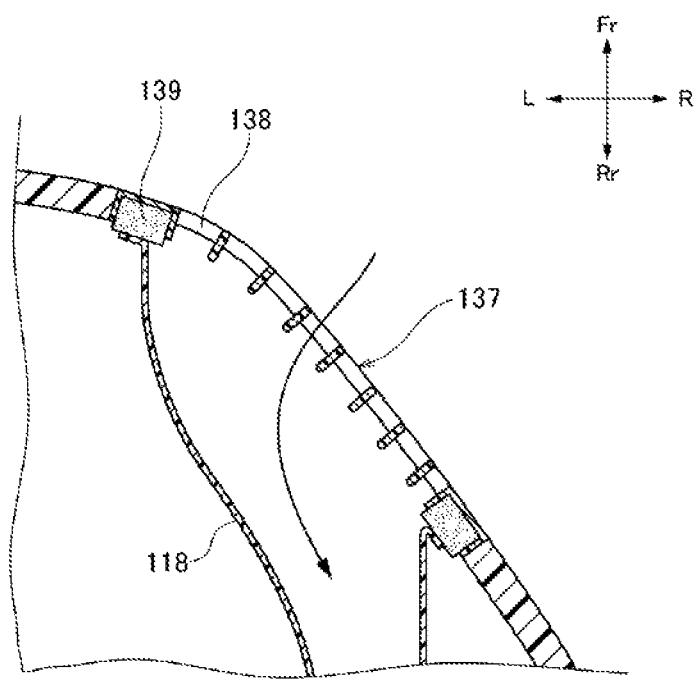
FIG. 8 is a sectional view taken along a line B-B in FIG. 7.
Figure 9:
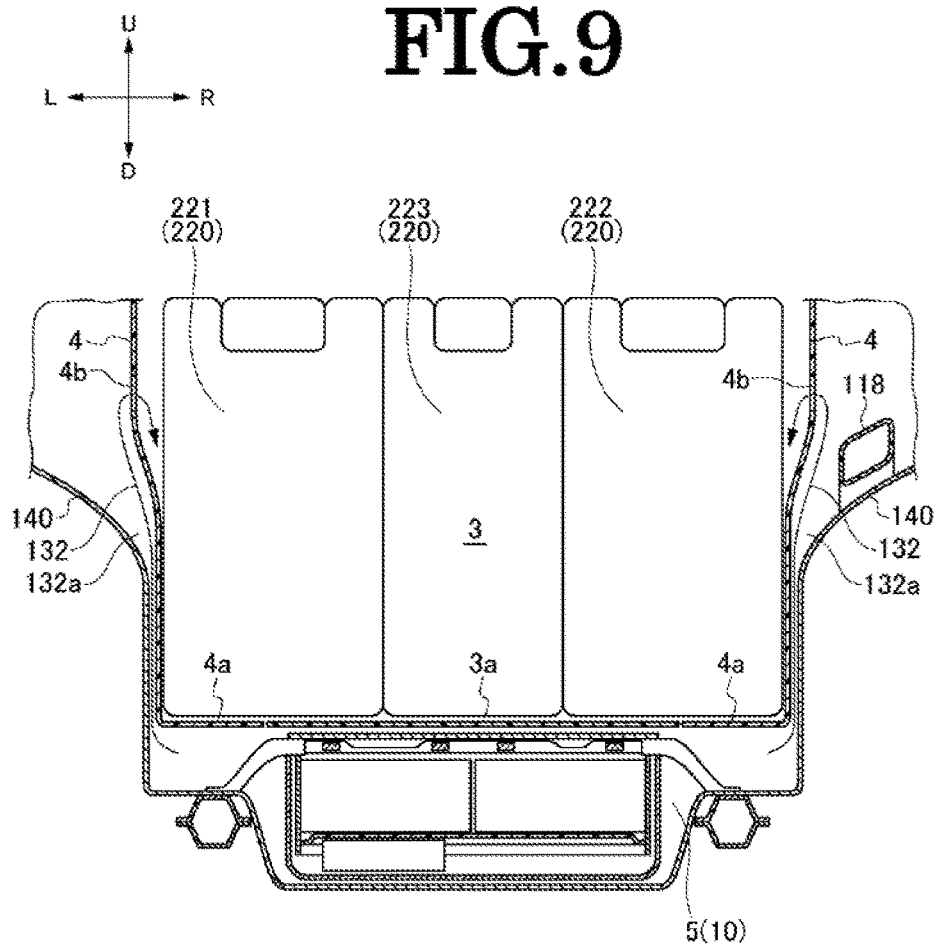
FIG. 9 is a sectional view taken along a line C-C in FIG. 5, showing the luggage compartment-bound exhaust air flow path.

Next, the passenger compartment-bout exhaust air flow path 131 and the luggage compartment-bound exhaust air flow path 132, both of which constitute a gist of the invention, will be described by reference to FIGS. 5 to 9. FIG. 5 is a plan view of the rear part of the passenger compartment 6 and the luggage compartment 3, showing the passenger compartment-bound exhaust air flow path 131 and the luggage compartment-bound exhaust air flow path 132, FIG. 6 is a sectional view taken along a line A-A in FIG. 5, showing a position of a partition member 134, FIG. 7 is a front view of a lower portion of the rear seat, showing positions of an inlet port 137 and an outlet port 136, FIG. 8 is a sectional view taken along a line B-B in FIG. 7, and FIG. 9 is a sectional view taken along a line C-C in FIG. 5, showing the luggage compartment-bound exhaust air flow path 132.

As shown in FIG. 5, air used to cool the battery modules 11 is let out from the outlet duct 119 into the battery storage space 5, which is a space defined on the underside of the luggage compartment 3. As shown in FIG. 9, the rear floor 3a (refer to FIG. 9), which makes up the floor surface 9 of the luggage compartment 3, covers above the battery storage space 5, and the extending portions 4a of the side trims 4, which similarly make up the floor surface 9, cover above the luggage compartment underside space 10 at both sides of the battery storage space 5. The outlet duct 119 is disposed at the rear of the battery unit 100 in a position that is offset leftwards with respect to a transverse center line of the vehicle 1, and air used for cooling is let out from here into the battery storage space 5.

Figure 6:
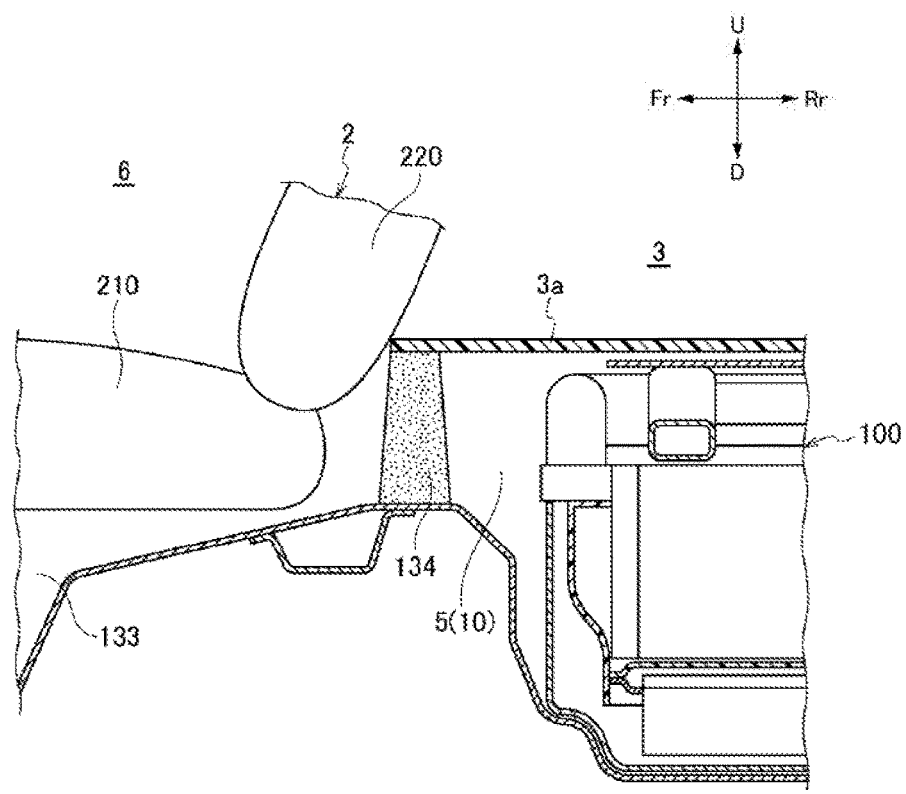
FIG. 6 is a sectional view taken along a line A-A in FIG. 5, showing a position of a partition member.

As shown in FIGS. 5 and 6, the partition member 134 is provided at a front end portion of the battery storage space 5 so as to separate a space 133 defined underneath the rear seat 2 (hereinafter, referred to as a rear seat underside space 133) and the battery storage space 5 (the luggage compartment underside space 10). The partition member 134 of this embodiment is formed of a foamed resin material such as foamed polypropylene and is provided so as to be held by a front end portion of the rear floor 3a and the front portion of the battery storage space 5 (the luggage compartment underside space 10) therebetween to thereby separate the battery storage space 5 (the luggage compartment underside space 10) and the rear seat underside space 133.

Referring to FIG. 1, too, two exhaust air passage holes 134a, 134b are formed in the partition member 134 so as to establish a communication between the battery storage space 5 and the rear seat underside space 133 in transverse predetermined positions. Of the two exhaust air passage holes 134a, 134b, one or a first exhaust air passage hole 134a makes up a first passenger compartment-bound exhaust air flow path 131a that is formed in a left transverse end portion of the partition member 134, and the other or a second exhaust air passage hole 134b makes up a second passenger compartment-bound exhaust air flow path 131b that is formed in a transverse center portion of the partition member 134. By doing so, the first passenger compartment-bound exhaust air flow path 131a and the second passenger compartment-bound exhaust air flow path 131b are provided. The first passenger compartment-bound exhaust air flow path 131a returns the exhaust air discharged into the battery storage space 5 to the passenger compartment 6 by way of the first exhaust air passage hole 134a that is formed in the partition member 134 and the rear seat underside space 133, while the second passenger compartment-bound exhaust air flow path 131b returns the exhaust air discharged into the battery storage space 5 to the passenger compartment 6 by way of the second exhaust air passage hole 134b formed in the partition member 134 and the rear seat underside space 133.

The rear seat 2 includes a seat cushion portion 210 and a backrest portion 220. The seat cushion portion 210 includes a left rear seat cushion portion 211, a right rear seat cushion portion 212 and a center rear seat cushion portion 213. The backrest portion 220 includes a left rear backrest portion 221, a right rear backrest portion 222 and a center rear backrest portion 223. Additionally, the backrest portion 220 can be folded down to the front so as to be stowed in place, and the luggage compartment 3 can be expanded to the rear of the passenger compartment 6 by stowing the backrest portion 220 in the way described above.

In returning the exhaust air discharged from the battery unit 100 into the battery storage space 5 to the passenger compartment 6 by way of the second exhaust air passage hole 134b formed in the transverse center portion of the partition member 134 and the rear seat underside space 133, the second passenger compartment-bound exhaust air flow path 131b is passed by way of a portion lying underneath the center rear seat cushion portion 213 which is used less frequently to thereby suppress the influence of the exhaust air (exhaust heat) on an occupant or occupants. As shown in FIG. 7, the exhaust air that flows along the second passenger compartment-bound exhaust air flow path 131b is let out from a gap 135 defined between a front lower end portion of the center rear seat cushion portion 213 and a passenger compartment floor 6a into the passenger compartment 6.

In returning the exhaust air discharged from the battery unit 100 into the battery storage space 5 to the passenger compartment 6 by way of the first exhaust air passage hole 134a formed in the left transverse end portion of the partition member 134 and the rear seat underside space 133, the first passenger compartment-bound exhaust air flow path 131a suppresses the increase in temperature of an overhead space above the rear seat 2 by letting out the exhaust air from the outlet port 136 that is formed below a front end portion of the rear seat 2 into the passenger compartment 6.

The outlet port 136 is disposed at a left transverse end portion below the front end portion of the rear seat 2, while the inlet port 137, which is configured to taken in battery cooling air from the passenger compartment 6, is disposed at a right transverse end portion below the front end portion of the rear seat 2. A grill 138 configured to prevent the intrusion of foreign matters is provided on each of the outlet port 136 and the inlet port 137. As shown in FIG. 8, the upstream-side inlet duct 118 is connected to the inlet port 137 via a substantially annular seal member 139. As shown in FIG. 7, the inlet port 137 and the outlet port 136 are preferably symmetrical with each other with respect to the transverse center line L of the vehicle 1. By doing so, the outlet port 136 and the inlet port 137 are spaced apart from each other, whereby not only can the influence of the exhaust air discharged from the outlet port 136 into the passenger compartment 6 on intake air that is to be taken in for cooling be reduced, but also the appearance can be improved.

The outlet port 136 opens obliquely leftwards and forwards to thereby be directed towards an adjacent left rear-seat door (not shown), while the inlet port 137 opens obliquely rightwards and forwards to thereby be directed towards an adjacent right rear-seat door (not shown). By adopting this configuration, the outlet port 136 and the inlet port 137 are caused to open in the opposite directions, thereby making it possible to reduce the influence of the exhaust air discharged from the outlet port 136 into the passenger compartment 6 on intake air that is to be taken in for cooling. In this embodiment, while the outlet port 136 and the inlet port 137 are disposed at the same level, the outlet port 136 may be disposed in a higher position than the inlet port 137. By doing so, it is possible to restrict the exhaust air discharged from the outlet port 136 from flowing towards the inlet port 137 due to a difference in temperature between the exhaust air and air inside the passenger compartment 6.

The outlet port 136 communicates with the first exhaust air passage hole 134a in the partition member 134 via the rear seat underside space 133. In this embodiment, while the outlet port 136 is made to communicate with the first exhaust air passage hole 134a in the partition member 134 via the rear seat underside space 133, an outlet duct may be disposed which establishes a communication between the outlet port 136 and the first exhaust air passage hole 134a of the partition member 134. It is possible to prevent the occurrence of an unexpected leakage of air by disposing the outlet duct.

As shown in FIGS. 5 and 9, the luggage compartment 3 is defined by the side trims 4 at both sides thereof and as has been described above, a lower side of the luggage compartment 3 is separated from the luggage compartment underside space 10 including the battery storage space 5 by the rear floor portion 3a and the extending portions 4a of the side trims 4, which make up the floor surface 9. Spaces 132a are defined in interiors of the side trims 4 which are defined between a body 140 of the vehicle 1 and the side trims 4, and the luggage compartment-bound exhaust air flow path 132 is made up by making use of the spaces 132a. Namely, the luggage compartment-bound exhaust air flow path 132 causes the air discharged from the outlet duct 119 of the battery unit 100 into the battery storage space 5 to rise while passing through the interiors of the left and right side trims 4. A slit 4b is formed in an upper portion of each of the side trims 4 so as to communicate with the luggage compartment 3, whereby the exhaust air is discharged through this slit 4b into the luggage compartment 3.

Thus, as has been described heretofore, according to the battery cooling structure for the vehicle 1 of this embodiment, since the exhaust air used to cool the battery modules 11 is discharged separately into the passenger compartment 6 and the luggage compartment 3 by way of the battery storage space 5, the influence of the exhaust air (exhaust heat) on an occupant or occupants can be suppressed, thereby making it possible to ensure a comfortable in-vehicle environment.

Additionally, since the exhaust air used to cool the battery modules 11 is returned from the outlet port 136 that is provided below the front end portion of the rear seat 2 into the passenger compartment 6, the temperature in the rear seat overhead space is restrained from being increased by the exhaust air that is returned to the passenger compartment 6, thereby making it possible to improve further the in-vehicle environment.

In addition, since the inlet port 137 and the outlet port 136 are spaced apart from each other, the influence of the exhaust air that is returned from the outlet port 136 into the passenger compartment 6 on the intake air that is to be taken in for cooling is reduced, thereby making it possible to suppress a reduction in cooling efficiency.

Since the outlet port 136 and the inlet port 137 open in the opposite directions, the influence of the exhaust air that is returned from the outlet port 136 into the passenger compartment 6 on the intake air that is to be taken in for cooling can be reduced further.

The invention is not limited to the embodiment that has been described heretofore and hence can be modified or improved as required.

For example, in the embodiment, while the outlet port 136 is disposed at the left transverse end portion below the front end portion of the rear seat 2, whereas the inlet port 137 is disposed at the right transverse end portion below the front end portion of the rear seat 2, the outlet port 136 and the inlet port 137 may be disposed in the other way round. Thus, the inlet port 137 and the outlet port 136 can be provided at arbitrary places, provided that air can be taken in properly from the passenger compartment 6 to cool the battery modules 11 and the exhaust air used to cool the battery modules 11 can be let out into the passenger compartment 6 properly.

Additionally, seat belt openings may be used in place of the slits 4b provided in the side trims 4 to let out the air used to cool the battery modules 11 into the luggage compartment 3. Alternatively, outlet ports may be provided separately in the side trims 4.

This patent application is based on Japanese Patent Application (No. 2015-020836) filed on Feb. 5, 2015, the contents of which are incorporated herein by reference.

DESCRIPTION OF REFERENCE NUMERALS AND CHARACTER

1 Vehicle
2 Rear seat
3 Luggage compartment
3a Rear floor
5 Battery storage space
6 Passenger compartment
11 Battery module
18 Cooling mechanism (battery cooling unit)
131 Passenger compartment-bound exhaust air flow path
132 Luggage compartment-bound exhaust air flow path
133 Rear seat underside space
134 Partition member
134a First exhaust air passage hole (exhaust air passage hole)
134b Second exhaust air passage hole (exhaust air passage hole)
136 Outlet port
137 Inlet port
L Transverse center line

The invention claimed is:

1. A battery cooling structure for a vehicle comprising:
a battery storage space that is defined underneath a luggage compartment provided behind a rear seat and covered by a rear floor;
a battery module that is stored in the battery storage space; and
a battery cooling unit that cools the battery module using air taken in from a passenger compartment, and discharges air used to cool the battery module into the battery storage space,
wherein the battery cooling structure further comprises:
a partition member that separates the battery storage space and a rear seat underside space that is provided underneath the rear seat;
a passenger compartment-bound exhaust air flow path that returns an exhaust air discharged into the battery storage space to the passenger compartment by way of the rear seat underside space and an exhaust air passage hole formed in the partition member; and
a luggage compartment-bound exhaust air flow path that includes a space defined between a body of the vehicle and a side trim and that discharges the exhaust air into the luggage compartment.

2. The battery cooling structure for a vehicle according to claim 1,
wherein the battery cooling structure further includes an outlet port that is provided below a front end portion of the rear seat, and
wherein the outlet port communicates with the exhaust air passage hole by way of the rear seat underside space.

3. The battery cooling structure for a vehicle according to claim 2,
wherein the battery cooling structure further includes an inlet port that introduces air to cool the battery module from the passenger compartment,
wherein the inlet port is disposed at one transverse end portion below the front end portion of the rear seat, and
wherein the outlet port is disposed at an other transverse end portion below the front end portion of the rear seat.

4. The battery cooling structure for a vehicle according to claim 3,
wherein the outlet port and the inlet port open obliquely forwards and outwards to thereby be directed to corresponding adjacent doors.

5. The battery cooling structure for a vehicle according to claim 1,
wherein the battery cooling structure further includes an outlet port that is provided below a front end portion of the rear seat, and
wherein the outlet port communicates with the exhaust air passage hole by way of an outlet duct that is provided in the rear seat underside space.

6. The battery cooling structure for a vehicle according to claim 1, wherein the side trim includes an opening communicating the space with the luggage compartment to discharge the exhaust air through the opening into the luggage compartment.

7. A battery cooling structure for a vehicle comprising:
a battery storage space that is defined underneath a luggage compartment provided behind a rear seat and covered by a rear floor;
a battery module that is stored in the battery storage space; and
a battery cooling unit that cools the battery module using air that is taken in from a passenger compartment and discharges air used to cool the battery module into the battery storage space,
wherein the battery cooling structure further comprises:
a passenger compartment-bound exhaust air flow path that returns an exhaust air discharged into the battery storage space to the passenger compartment; and
a luggage compartment-bound exhaust air flow path that includes a space defined between a body of the vehicle and a side trim and that discharges the exhaust air into the luggage compartment,
wherein an inlet port that introduces air to cool the battery module from the passenger compartment is disposed at one transverse end portion below a front end portion of the rear seat, and
wherein an outlet port of the passenger compartment-bound exhaust air flow path is disposed at an other transverse end portion below the front end portion of the rear seat.

8. The battery cooling structure for a vehicle according to claim 7,
wherein the inlet port and the outlet port are disposed transversely symmetrical with each other with respect to a transverse center line of the vehicle.

9. The battery cooling structure for a vehicle according to claim 7,
wherein the outlet port and the inlet port open obliquely forwards and outwards to thereby be directed to corresponding adjacent doors.

10. The battery cooling structure for a vehicle according to claim 7, wherein the side trim includes an opening communicating the space with the luggage compartment to discharge the exhaust air through the opening into the luggage compartment.

11. A battery cooling structure for a vehicle comprising:
a battery storage space that is defined underneath a luggage compartment provided behind a rear seat and covered by a rear floor;
a battery module that is stored in the battery storage space; and
a battery cooling unit that cools the battery module using air that is taken in from a passenger compartment and discharges air used to cool the battery module into the battery storage space,
wherein the battery cooling structure further comprises:
a passenger compartment-bound exhaust air flow path that returns an exhaust air discharged into the battery storage space to the passenger compartment; and
a luggage compartment-bound exhaust air flow path that discharges the exhaust air into the luggage compartment,
wherein an inlet port that introduces air to cool the battery module from the passenger compartment is disposed at one transverse end portion below a front end portion of the rear seat, and
wherein an outlet port of the passenger compartment-bound exhaust air flow path is disposed at an other transverse end portion below the front end portion of the rear seat,
wherein the inlet port and the outlet port are disposed transversely symmetrical with each other with respect to a transverse center line of the vehicle.

* * * * *